United States Patent [19]
Jung

[11] Patent Number: 5,331,052
[45] Date of Patent: Jul. 19, 1994

[54] CURABLE COMPOSITION BASED ON BRANCHED ACRYLATES WITH CARBOXYL GROUPS AND/OR BRANCHED ACRYLATES WITH EPOXIDE GROUPS AND AMINOPLAST RESINS

[75] Inventor: Werner A. Jung, Ascheberg, Fed. Rep. of Germany

[73] Assignee: BASF Lacke + Farben AG, Münster, Fed. Rep. of Germany

[21] Appl. No.: 411,525

[22] PCT Filed: Mar. 25, 1988

[86] PCT No.: PCT/EP88/00249

§ 371 Date: Sep. 29, 1989

§ 102(e) Date: Sep. 29, 1989

[87] PCT Pub. No.: WO88/07565

PCT Pub. Date: Oct. 6, 1988

[30] Foreign Application Priority Data

Mar. 31, 1987 [DE] Fed. Rep. of Germany ....... 3710668

[51] Int. Cl.$^5$ ............. C08L 61/26; C08L 61/24; C08L 33/02
[52] U.S. Cl. ................. 525/155; 525/157; 525/161; 525/163; 525/164; 525/187; 525/190; 525/208; 525/221; 525/222; 525/232; 525/241; 525/227
[58] Field of Search ............... 525/155, 163, 161, 187, 525/190, 157, 164, 241, 232, 208, 221, 222, 227

[56] References Cited

U.S. PATENT DOCUMENTS

| | | | |
|---|---|---|---|
| 3,542,711 | 11/1970 | Manasia | 260/23 |
| 3,751,399 | 8/1973 | Lee et al. | 260/47 |
| 3,890,284 | 6/1975 | Ohnishi et al. | 260/78.4 EP |
| 4,681,811 | 7/1987 | Simpson et al. | 528/112 |
| 4,711,949 | 12/1987 | Sherwin | 526/318 |
| 4,839,448 | 6/1989 | Jung et al. | 526/262 |
| 4,880,889 | 4/1989 | Jung et al. | 526/323 |
| 4,883,838 | 11/1989 | Jung et al. | 525/119 |
| 5,093,408 | 3/1992 | Jung et al. | 524/512 |

FOREIGN PATENT DOCUMENTS

| | | |
|---|---|---|
| 0031199 | 8/1983 | European Pat. Off. ..... C08F 220/18 |
| 0103199 | 8/1983 | European Pat. Off. . |
| 0134691 | 9/1984 | European Pat. Off. . |
| 3022996 | 4/1981 | Fed. Rep. of Germany . |
| 1148190 | 4/1969 | United Kingdom . |
| 2029422 | 8/1978 | United Kingdom . |

OTHER PUBLICATIONS

Journal Polymer Science & Engineering, Amine Resin Section, vol. 1, p. 770 (1985).

*Primary Examiner*—James J. Seidleck
*Assistant Examiner*—W. Robinson H. Clark
*Attorney, Agent, or Firm*—Kenyon & Kenyon

[57] ABSTRACT

Curable composition based on branched acrylates with COOH groups and/or branched acrylates with epoxide groups, and aminoplast resins.

The present invention relates to a curable composition consisting of

A) a polymer with at least 2 COOH groups,
B) a polymer with at least 2 epoxide groups and
C) an aminoplast resin.

At least one of components A) or B) is based on a branched soluble acrylate copolymer, more than 3 to 30% by weight, based on the total weight of the monomers, of a monomer with at least two polymerizable, olefinically unsaturated double bonds being used in the preparation of these branched acrylate copolymers and the proportions of the individual components relative to one another being chosen so that a molar ratio of 3:1 to 1:3 prevails between the carboxyl groups of component A) and the epoxide groups of component B) and a weight ratio of 65:35% by weight to 98:2% by weight prevails between the epoxy resin component and the aminoplast resin component.

The invention also relates to coating agents based on the curable composition.

10 Claims, No Drawings

CURABLE COMPOSITION BASED ON BRANCHED ACRYLATES WITH CARBOXYL GROUPS AND/OR BRANCHED ACRYLATES WITH EPOXIDE GROUPS AND AMINOPLAST RESINS

The invention relates to a curable composition based on branched soluble acrylate copolymers which are obtainable by copolymerization of monomers having at least two polymerizable olefinic unsaturated double bonds, functional groups-carrying monomers, and additional polymerizable monomers with an olefinic unsaturated double bond.

From the class-forming EP-A 103 199 an acrylate copolymer is known which is obtained by copolymerization of 10 to 95 percent by weight of tert-butyl acrylate, 0.1 to 3 percent by weight of polyfunctional monomers such as, for example, trimethylolpropane-triacrylate, 1 to 30 percent by weight of monomers having a functional group, and 0 to 80 percent by weight of additional polymerizable ethylenic unsaturated monomers. As comonomers with a functional group are named inter alia carboxyl groups-containing monomers such as acrylic acid and methacrylic acid. From this publication, furthermore, a coating composition is known which contains a carboxyl groups-containing acrylate copolymer branched by polymerizing into it multiply ethylenic unsaturated monomers and a polyepoxide as cross-linking agent. The described branched acrylate copolymers lead to coatings with good resistance to weather, in particular good resistance to moisture which can be traced back to the content of monopolymerized tert-butyl acrylate.

From DE-P 30 22 996 is known an annealing lacquer in the case of which carboxyl groups-containing polymers, such as for example acrylates based on acrylic acid or methacrylic acid and glycidyl groups-containing acrylates can be mixed to form a curable composition. This leads to films with greater hardness and resistance to weather.

In WO 84/00771 a multi-component system is described in which a total of four types of binding agents or components are mixed with each other and then applied; the components are:
a) OH-acrylate,
b) acid anhydride, wherein at least 50 percent are alkylhexahydrophthalic anhydride,
c) epoxide resin, and
d) melamine resin.

No statements are made regarding the potlife of the mixture; particular advantage compared to conventional systems is said to be the high solid on application, partially greater than 70 percent solid matter.

In DE-OS 23 33 384 a binding agent based on acrylated polyesters is described, i.e. in an OH polyester (or alkyd resin) an OH acrylate is polymerized with relatively low acid number, wherein the cross linking can be carried out with melamine resins and simultaneously epoxide resins can be carried out. The proportions are: 60 to 70% OH copolymer, 20 to 30% melamine resin, 5 to 15% epoxide resin.

Advantages compared to existing systems are said to be: improved resistance to weather (therefore low-aroma acrylate), improved resistance to solvents and improved tendency of the lacquers to run on vertical surfaces.

The task of the present invention consisted in combining all positive properties of the known coating materials in a curable composition, in particular to achieve the porperties of the coating materials from the aspect of their resistance to long-term stress by solvents, chemicals, water or water vapor as well as to achieve simultaneously good hardness and elasticity. Furthermore, for reasons of economy a high solid content of the curable coating material is to be achievable at relatively low viscosity.

This task is solved, surprisingly, by a curable composition which consists of carboxyl groups-containing polymers, epoxide groups-containing polymers and aminoplastic resins, and wherein the epoxide component and/or the carboxyl component is based on a soluble branched acrylate copolymer which has a higher fraction of monopolymerized multiply ethylenic unsaturated monomers than the acrylate resin described in EP-A-103 199. In contrast to linear acrylate resins and the acrylate resins from EP-A-103 199 in the case of the acrylate copolymers according to the invention a lower viscosity at relatively high solid content can be achieved. Through the highly branched structure of the copolymer the functional groups of the acrylate resin become more reactive which carries with it a great advantage.

Subject matter of the present invention is a curable composition comprising:
A) a polymer having at least two —COOH groups,
B) a polymer having at least two epoxide groups, and
C) an aminoplastic resin characterized in that at least one of the components A) or B) is based on a branched soluble acrylate copolymer, wherein the production of this branched acrylate copolymer 5 to 30 percent by weight, relative to the total weight of the monomers, of a monomer with at least two polymerizable olefinic unsaturated double bonds are used and wherein the proportions of the individual components to each other are so selected that between the carboxyl groups of the component A) and the epoxide groups of the component B) a molar ratio of 3:1 to 1:3 obtains and between the epoxide resin component and the aminoplastic resin component a ratio of weight of 65:35 percent by weight to 98:2 percent by weight.

According to an embodiment of the invention the component A) is based on a soluble branched copolymer obtainable by copolymerization of
a1) 5 to 30 percent by weight, preferred are 5 to 25 percent by by weight, of a monomer with at least two polymerizable olefinic unsaturated double bonds,
a2) 3 to 50 percent by weight, preferred are 8 to 40 percent by weight, of a carboxyl groups-containing monomer,
a3) at least 40 percent by weight of additional monomers with a polymerizable olefinic unsatured double bond, wherein the sum of a1), a2), and a3) is 100 percent by weight, in an organic solvent at 70° to 1300° C., preferably at 80° to 120° C., with the use of at least 0.5 percent by weight, preferably at least 2.5 percent by weight, relative to the total weight of the monomers, of a polymerization regulator and with the use of polymerization initiators, wherein the polymerization for the production of the acrylate copolymer is carried out so that a solution of the polymer with a solid content of 40 to 65 percent by weight results.

As component a1) can be used advantageously compounds of the general formula

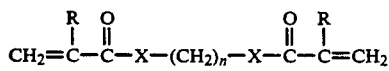

in which
R=H or CH$_3$
X=O, NR', S with R'=H, alkyl, aryl
n=2 to 8.

Examples of such compounds are hexanediol diacrylate, hexanediol dimethacrylate, glycol diacrylate, glycoldidimethacrylate, butanedioldiacrylate, butanedioldimethacrylate, hexamethylenebismethacrylamide, trimethylol propane triacrylate, trimethylol propane trimethacrylate. Suitable are also divinyl compounds such as divinyl benzene. It is also possible to use multiply unsaturated monomers with a functional group, for example bisacrylamido acetic acid. It is understood that also combinations of the multiply unsaturated monomers can be used.

Further possible components a1) are conversion products of a carboxylic acid having a polymerizable olefinic unsaturated double bond and glycidyl acrylate and/or glycidyl methacrylate. It is also possible to use as component a1) a polycarboxylic acid esterified with an unsaturated alcohol containing a polymerizable double bond or unsaturated monocarboxylic acid. As monomers with at least two polymerizable olefinic unsaturated double bonds conversion products of a polyisocyanate with alcohols or amines containing unsaturated polymerizable double bonds are also used. By example the conversion product of one mole of hexamethylene diisocyanate with two moles of allyl alcohol may be cited.

As component a2) β-carboxyethyl acrylate is especially suitable; furthermore, acrylic acid, methacrylic acid, itaconic acid, crotonic acid, aconitic acid, maleic and fumaric acid or their semi-esters are possible.

The choice of component a3) depends largely on the desired properties of the acrylate copolymer with respect to elasticity, hardness, compatibility, and polarity. These properties can be partially controlled with the help of known glass transition temperatures of the monomers. The monomers can be selected from the group comprising styrene, vinyl toluene, alkyl ester of acrylic acid and methacrylic acid, alkoxyethyl acrylate as well as esters of maleic, fumaric, crotonic, and dimethyl acrylic acid.

In addition, as component a3) can be used also hydroxyl groups-containing monomers for example hydroxyalkyl esters of acrylic and/or methacrylic acid. It is possible, to use as additional monomers with a polymerizable olefinic unsaturated double bond 0.1 to 5 percent by weight, relative to the total weight of all monomers, monomers with phosphoric acid groups, also, for example, phosphoric acid esters with polymerizable double bonds.

It is particularly advantageous if into the acrylate copolymer having an acid number of 20 to 250, preferably 50 to 180, monomers are incorporated containing groups which catalyse a subsequent cross-linking of the carboxyl groups-containing acrylate copolymer with epoxide groups, thus, for example, tertiary amino groups.

The present invention relates also to a curable compound characterized in that as component A) a soluble branched acrylate copolymer is used which is obtainable by copolymerization of a1) 5 to 30 percent by weight, preferred are 5 to 25 percent by weight, of a monomer with at least two polymerizable olefinic unsaturated double bonds wherein di- and polyesters of di- and polyols with acrylic acid are excluded, a2) 3 to 50 percent by weight, preferably 8 to 40 percent by weight of a carboxyl groups-containing monomer, a4) 0.1 to 20 percent by weight, preferred are 1 to 10 percent by weight, of a tertiary amine with a polymerizable olefinic unsaturated double bond, a5) 0 to 40 percent by weight, preferred are 5 to 25 percent by weight, of a hydroxyl groups-containing monomer, and a3) 0 to 80 percent by weight of further monomers with a polymerizable olefinic unsaturated double bond, wherein the sum of components a1), a2), a3), a4), and a5) is 100 percent by weight, in an organic solvent at 70° to 1300° C., preferably at 80° to 120° C., with the use of at least 0.5 percent by weight, preferably at least 2.5 percent by weight, relative to the total weight of the monomers, of a polymerization regulator and with the use of polymerization initiators, wherein the polymerization for the production of the acrylate copolymer is carried out so that a solution of the polymer with a solid content of 40 to 65 percent by weight results, wherein the proportions of the individual components to each other are so selected that between the carboxyl groups of the component A) and the epoxide groups of component B) a molar ratio of 3:1 to 1:3 obtains and that between the epoxide resin component and the aminoplastic resin component a weight ratio of 65:35 percent by weight to 98:2 percent by weight obtains.

As component a1) can be used advantageously compounds of the general formula

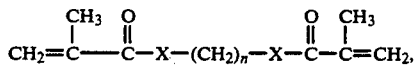

in which
X=O, NR', S with R'=H, alkyl, aryl
n=2 to 8.

Component a1) can be a conversion product of a carboxylic acid having a polymerizable olefinic unsaturated double bond, wherein acrylic acid is excluded, and glycidyl methacrylate. Furthermore, monocarboxylic acids with an unsaturated a polymerizable double bond with the exception of derivatives of acrylic acid are possible. Advantageously components a1) are selected from products produced from polyisocyanates with unsaturated polymerizable double bonds-containing alcohols or amines.

Examples of ethylenic unsaturated compounds with a tertiary amino groups, thus for component a4) are N,N'-dimethylaminoethyl methacrylate, N,N'-diethylaminoethyl methacrylate, 2-vinyl pyridine, and 4 vinyl pyridine, vinyl pyrroline, vinyl quinoline, vinyl isoquinoline, N,N'-dimethylaminoethyl vinyl ether and 2-methyl-4-vinyl pyridine.

If necessary, hydroxyl groups-containing monomers can be used. As examples hydroxyl alkyl esters of acrylic and methacrylic acid may be named, such as, for example, hydroxyethyl acrylate, hydroxypropyl acrylate, hydroxybutyl acrylate, hydroxyamyl acrylate, hydroxyhexyl acrylate, hydroxyoctyl acrylate, and the corresponding methacrylatles. The choice of additional monomers with a polymerizable olefinic unsaturated double bond takes place from the group already cited above. In this case it is potentially advantageous that as additional monomers with a polymerizable double bond 0.1 to 5 percent by weight, relative to the total weight of all monomers, monomers with phosphoric acid groups are used.

It is particularly preferred if as component A) a soluble branched acrylate copolymer is used which is obtainable by copolymerization of a1) 5 to 30 percent by weight, preferred are 5 to 25 percent by weight, of a monomer with at least two polymerizable olefinic unsaturated double bonds wherein di- and polyesters of di- and polyols with acrylic acid are excluded, a4) 0.1 to 20 percent by weight, preferred are 1 to 10 percent by weight, of a tertiary amine with a polymerizable olefinic unsaturated double bond, a5) 0 to 40 percent by weight, preferred are 10 to 30 percent by weight, of hydroxyl groups-containing monomers, a3) 0 to 80 percent by weight of additional plymerizable monomers with an olefinic unsaturated double bond, wherein the sum of all monomers is 100 percent by weight, in an organic solvent at 70° to 1300° C., preferably at 80° to 1200° C., with the use of at least 0.5 percent by weight, preferably at least 2.5 percent by weight, relative to the total weight of the monomers, of a polymerization regulator and with the use of polymerization initiators, wherein the polymerization for the production of the acrylate copolymer is so carried out that a solution of the polymer results with a solid content of 40 to 65 percent by weight, and of a6) cyclic carboxylic anhydrides, wherein the proportions of the individual components to each other are so selected that between the carboxyl groups of component A) and the epoxide groups of component B) a molar ratio of 3:1 to 1:3 obtains and that between the epoxide resin component and the aminoplastic resin component a weight ratio of 65:35 percent by weight to 98:2 percent by weight obtains.

As component a1) can be used advantageously compounds of the general formula

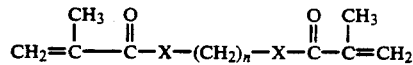

in which
X=O, NR', S with R'=H, alkyl, aryl
n=2 to 8.

Examples of multiply ethylenic unsaturated compounds are hexanedioldimethacrylate, glycol dimethacrylate, butanediol dimethacrylate, trimethylolpropane trimethacrylate, and divinyl benzene. Advantageously the already cited ethylenic unsaturated compounds can also be used, provided that they are not di-and polyesters of di- and polyols with acrylic acid.

As polymerizable tertiary amines those already cited above are possible.

As component a5) are suitable hydroxyl alkyl esters of acrylic and/or methacrylic acid with a primary hydroxyl group, for example hydroxyethyl acrylate, hydroxypropyl acrylate, hydroxybutyl acrylate, hydroxyamyl acrylate, hydroxyhexyl acrylate, hydroxyoctyl acrylate, and the corresponding methacrylates as well as hydroxyalkyl esters with a secondary —OH group, such as 2-hydroxypropyl acrylate, 2-hydroxy butyl acrylate, 3-hydroxybutyl acrylate, and the corresponding methacrylates.

In addition, as component a5) conversion products of acrylic acid and/or methacrylic acid with the glycidyl esters of a carboxylic acid with a tertiary α-carbon atom are possible.

The choice of component a3) is not particularly critical and depends on the desired properties of the acrylate copolymer. It may be mentioned that as component a3) also carboxyl groups-containing monomers can be used.

Examples of the component a6) are phthalic anhydride, tetrahydrophthalic anhydride, hexahydrophthalic anhydride, succinic anhydride as well as their halogenated derivatives.

The invention relates also to a curable composition characterized in that as component A) a soluble branched acrylate copolymer is used which is obtainable by copolymerization of a1) 5 to 30 percent by weight, preferred are 5 to 25 percent by weight of a monomer with at least two polymerizable olefinic unsaturated double bonds, a7) 1 to 30 percent by weight, preferred are 3 to 20 percent by weight, of monomers with cyclic carboxylic anhydride groups, a3) 45 to 80 percent by weight of further polymerizable monomers with an olefinic unsaturated dobule bond, wherein the sum of all monomers is 100 percent by weight, in an organic solvent at 70° to 1300°C., preferably at 80° to 120° C., by using at least 0.5 percent by weight, preferably at least 2.5 percent by weight, relative to the total weight of the monomers, a polymerization regulator and by using polymerization initiators, wherein the polymerization for the production of the acrylate copolymer is carried out so that a solution of the polymer with a solid content of 40 to 65 percent by weight results, and from a8) compounds which have at least one hydrogen able to react with acid anhydride groups as well as also at least one tertiary amino group, wherein a part of the carboxylic anhydride can also be converted with a monofunctional compound with active hydrogen and the proportions of the individual component to each other are so selected that between the carboxyl groups of component A) and the epoxide groups of component B) a molar ratio of 3:1 to 1:3 obtains and that between the peroxide resin component and the aminoplastic resin component a weight ratio of 65:35 percent by weight to 98:2 percent by 'weight obtains.

As component a1) are suitable the already cited multiply ethylenic unsaturated monomers including the di- and polyesters of di- and polyols with acrylic acid.

Examples of monomers with cyclic carboxylic anhydride groups are maleic anhydride or itaconic anhydride.

Choice of component a3) depends on the desired properties of the acrylate copolymer. It may be mentioned that in the present case monomers with carboxyl groups, thus, for example, acrylic acid or methacrylic acid are also suitable.

Advantageously, as component a8) alcohols having a tertiary amino group as well as primary or secondary amines having a tertiary amino group are used. The reactive hydrogen of component a8) can stem from a hydroxyl group, a primary or secondary amino group or a thiol group.

Examples of alcohols with tertiary amino groups are addition products of secondary amines and epoxide compounds. Examples of secondary amines are dimethylamine, diethylamine, dipropylamine, dibutylamine, morpholine and pyrrolidine.

Examples of suitable epoxide compounds are ethylene oxide, propylene oxide, butylene oxide, styrene oxide, and cyclohexene oxide.

Suitable alcohols with tertiary amino groups obtained in the reaction of secondary amines with epoxide compounds, are dimethylaminoethanol, diethylaminoethanol, di-n-propylaminoethanol, diisopropylaminoethanol, di-n-butyl-aminoethanol, N-(2-hydroxyethyl)morpholine, N-(2-hydroxyethyl)piperidine, N-(2-hydroxyethyl)pyrrolidone, N-(2-hydroxyethyl)azeridine, N,N'-dimethyl-2-hydroxypropylamine, N,N'-diethyl-2-hydroxypropylamine, triethanolamine, and tripropanolamine.

Examples of the primary or secondary amines, which contain a tertiary amino group, are N,N'-dialkyl-1,3-propylenediamine, such as for example N,N'-dimethyl-1,3-propylenediamine, N,N-diethyl-1,3-propylenediamine, and N,N'-dialkyl-1,4-tetraethylenediamine such as, for example, N,N'-dimethyl-1,4-tetramethylenediamine, and N,N'-diethyl-1,4-tetramethylenediamine. Furthermore, N,N'-dialkyl-1,6-hexamethylenediamine, and N-alkylpiperazine as well as 2-aminopyridine, 4-aminopyridine, and N-alkylaminopyridine are possible.

It may be mentioned that a part of the carboxylic anhydride groups can also be converted with a monofunctional compound with active hydrogen such as, for example, alcohols.

According to a preferred embodiment of the invention the component A) is advantageously obtained by copolymerization of
 a1) 5 to 30 percent by weight, preferred are 5 to 25 percent by weight, of a monomer with at least two polymerizable olefinic unsaturated double bonds,
 a9) 1 to 30 percent by weight of glycidyl esters of ethylenic unsaturated carboxylic acids and/or glycidyl ethers of olefinic unsaturated compounds,
 a3) at least 40 percent by weight of further polymerizable monomers with an olefinic unsaturated double bond,
wherein the sum of all monomers is 100 percent by weight, in an organic solvent at 70° to 130° C., preferably at 80 to 120° C., by using at least 0.5 percent by weight, preferably at least 2.5 percent by weight, relative to the total weight of the monomers, of a polymerization regulator and by using polymerization initiators, wherein the polymerization for the production of the acrylate copolymer is so carried out that a solution of the polymer with a solid content of 40 to 65 percent by weight results, and from
 a10) amines with a secondary amino group or di- or polyamines with at least one tertiary amino group and a primary or secondary amino group and/or
 a11) carboxylic acids having a tertiary nitrogen atom, and from
 a6) cyclic carboxylic anhydrides,
wherein the proportions of the individual components to each other are so selected that between the carboxyl groups of component A) and the epoxide groups of component B) a molar ratio of 3:1 to 1:3 obtains and that between the epoxide resin component and the aminoplastic resin component a ratio of weight of 65:35 to 98:2 percent by weight obtains.

As component a1) the already mentioned multiply ethylenic unsaturated monomers are possible.

Examples of components a9) are glycidyl esters of acrylic acid or methacrylic acid as well as allyl and vinyl glycidyl ethers, glycidyl vinyl esters or glycidyl allyl esters such as glycidyl vinyl phthalate, glycidyl allyl phthalate.

The choice of component a3) depends on the desired properties of the acrylate copolymer and can be made from the group already cited above. However, no carboxyl groups-containing amino groups-containing monomers should be used as component a3), since they react with the oxirane group of component a9). The fraction of hydroxyl groups-containing monomers should be minimal. If hydroxyl groups are necessary for achieving a particular polarity of the copolymer, monomers with secondary —OH groups should be preferred.

Examples of component a10) are imidazole, aminopyridine, N-alkylaminopyridine, Ethylpiperazine, dibutylamine.

Examples of component a11) are 3- and 4-dimethylaminobenzoic acid, picolinic acid, and dimethylaminosalicylic acid.

As examples for component a6) phthalic anhydride, tetrahydrophthalic anhydride, hexahydrophthalic anhydride, succinic anhydride as well as their halogenated derivatives may be named.

According to a preferred embodiment of the invention, component A) can be a soluble branched acrylate copolymer obtainable by the copolymerization of
 a1) 5 to 30 percent by weight, preferred are 5 to 25 percent by weight, of a monomer with at least two polymerizable olefinic unsaturated double bonds,
 a2) 3 to 50 percent by weight, preferred are 8 to 40 percent by weight of a carboxyl groups-containing monomer,
 a5) 0 to 40 percent by weight, preferred are 3 to 25 percent by weight of a hydroxyl groups-containing monomer, and
 a3) 0 to 80 percent by weight of further monomers with a polymerizable olefinic unsaturated double bond,
wherein the sum of all monomers is 100 percent by weight, in an organic solvent at 70° to 130° C., preferably at 80° to 120° C., using at least 0.5 percent by weight, preferably at least 2.5 percent by weight, relative to the total weight of the monomers, of a polymerization regulator and using polymerization initiators, wherein the polymerization for the production of the acrylate copolymer is so carried out that a solution of the polymer with a solid content of 40 to 65 percent by weight results, and from
 a12) monoisocyanates with a tertiary amino group in the molecule,
wherein the proportions of the individual components are so selected that between the carboxyl groups of component A) and the epoxide groups of component B) a molar ratio of 3:1 and 1:3 obtains and that between the epoxide resin component and the aminoplastic resin component a ratio of weight of 65:35 percent by weight to 98:2 percent by weight obtains.

As component a12) addition products of diisocyanates with amino alcohols are possible such as, for example, dimethyl- and diethylamino ethanol. The tertiary amino group can, for example, also be introduced through 2-hydroxyethyl pyridine. Particularly preferred is an addition product of isophorondiiscyanate with amino alcohols as component a12).

According to a preferred embodiment of the invention component A) can be obtained by the copolymerization of a1) 5 to 30 percent by weight, preferred are 5 to 25 percent by weight, of a monomer with at least two polymerizable olefinic unsaturated double bonds, a2) 0 to 40 percent by weight, preferred are 5 to 30 percent by weight, of a carboxyl groups-containing monomer, a5) 8 to 50 percent by weight, preferred are 10 to 40 percent by weight, of a hydroxyl groups-containing monomers, a3) 0 to 80 percent by weight of further polymerizable monomers with an olefinic unsaturated double bond, wherein the sum of all monomers is 100 percent by weight, in an organic solvent at 70° to 130° C., preferably at 80° to 120° C., using at least 0.5 percent by weight, preferably at least 2.5 percent by weight, relative to the total weight of the monomers, of a polymerization regulator and using polymerization initiators, wherein the polymerization for the production of the acrylate copolymer is so carried out that a solution of the polymer with a solid content of 40 to 65 percent by weight results, and from a12) monoisocyanates with a tertiary amino group in the molecule and from a6) cyclic carboxylic anhydrides, wherein the proportions of the individual components are so selected that between the carboxyl groups of component A) and the epoxide groups of component B) a molar ratio of 3:1 to 1:3 obtains and that between the epoxide resin component and the aminoplastic resin component a weight ratio of 65:35 percent by weight to 98:2 percent by weight obtains.

In the event that the component B) is based on a soluble branched acrylate copolymer, it is obtained by copolymerisation of b1) 5 to 30 percent by weight, preferred are 5 to 25 percent by weight, of a monomer with at least two polymerizable olefinic unsaturated double bonds, b2) 5 to 50 percent by weight, preferred are 10 to 40 percent by weight, of monomers with an epoxide group, and b3) at least 10 percent by weight of further monomers with a polymerizable olefinic unsaturated double bond, wherein the sum of b1) to b3) is 100 percent by weight, in an organic solvent at 70° to 130° C., preferably at 80° to 120° C., using at least 0.5 percent by weight, preferably at least 2.5 percent by weight, relative to the total weight of the monomers, of a polymerization regulator and using polymerization initiators where the polymerization for the production of the acrylate copolymer is so carried out that a solution of the polymer with a solid content of 40 to 65 percent by weight results, wherein the proportions of the individual components are so selected that between the carboxyl groups of component A) and the epoxide groups of component B) a molar ratio of 3:1 to 1:3 obtains and that between the epoxide resin component and the aminoplastic resin component a ratio of weight of 65:35 percent by weight to 98:2 percent by weight obtains.

As component b2) glycidyl esters of unsaturated carboxylic acids or glycidyl ethers of unsaturated compouns are preferably used. As examples may be named: glycidyl acrylate, glycidyl methacrylate, glycidyl esters of maleic and fumaric acid, glycidyl vinyl phthalate, glycidyl allyl phthalate, and glycidyl allyl malonate.

Component B) is likewise obtained by copolymerization of b1) 5 to 30 percent by weight, preferred are 5 to 25 percent by weight, of monomers with at least two polymerizable olefinic unsaturated double bonds, b4) 5 to 50 percent by weight, preferred are 10 to 40 percent by weight, of monomers with at least one polymerizable double bond and a functional group F, b3) further polymerizable monomers, wherein the sum of b1) to b3) is 100 percent by weight, in an organic solvent at 70° to 1300° C., preferably at 80° to 120° C., using at least 0.5 percent by weight, preferably at least 2.5 percent by weight, relative to the total weight of the monomers, of a polymerization regulator and using polymerization initiators, wherein the polymerization for the production of acrylate copolymer is so carried out that a solution of the polymer having a solid content of 40 to 65 percent by weight results, and from b5) an organic compound with at least one epoxide group and one group reactive with the functional group F of the monomers from b4), wherein the proportions of the individual components are so selected that between the carboxyl groups of component A) and the epoxide groups of component B) a molar ratio of 3:1 to 1:3 obtains and that between the epoxide resin component and the aminoplastic resin component a weight ratio of 65:35 percent by weight to 98:2 percent by weight obtains.

As component b4) and b5) monomers are possible with an isocyanate group (b4), as well as isocyanatoethyl methacrylate and isocyanatobutyl methacrylate as well as epoxypropanol (b5) or also carboxylic acid monomers (b4) and di- or polyepoxide compounds (b5).

When b4) is an isocyanate ester, F is an isocyanate, and when b4) is a carboxylic acid monomer, F is a carboxylic acid group.

When using carboxyl groups-containing monomers as component b4, preferably β-carboxyethyl acrylate is used proportionally. The carboxyl groups-containing monomer is advantageously proportionally a monomer with phosphoric acid groups.

The pre-crosslinked soluble acrylate copolymers A) or B) are produced in that the monomers are copolymerized in an organic solvent at 70° to 130° C., preferably at 80° to 120° C., using at least 0.5 percent by weight, preferably at least 2.5 percent by weight, relative to the total weight of the monomers, of a polymerization regulator and using polymerization initiators to form a pre-crosslinked branched but not galled product. If necessary, following the radical copolymerization can take place the conversion with the cyclic carboxylic anhydrides, the conversion with the compounds which contain at last one hydrogen able to react with acid anhydride groups as well as also at least one tertiary amino group as well as possibly with monofunctional compounds with active hydrogen or also the conversion with the secondary amines or the di- or polyamines with at least one tertiary amino group and one primary or secondary amino group and/or with carboxylic acids which contain one tertiary nitrogen as well as with the cyclic carboxylic anhydrides or possibly with the monoisocyanates containing one tertiary nitrogen group in the molecule, or also following the copolymerization with the monoisocyanates having a tertiary nitrogen group in the molecule and the conversion with cyclic carboxylic anhydrides or the conversion of a compound with at least one epoxide group and a group able to react with the functional group F of monomer b4).

It must be observed in the production of the acrylate copolymer that a pre-crosslinked but not gelled copolymer is obtained. Through appropriate polymerization conditions, surprisingly, a clear, transparent, non-galled solution of a branched copolymer can be produced. Through the use of monomers with at least two ethylenic unsaturated groups a pre-crosslinking of the copolymer molecules is brought about which, due to the special reaction conditions according to the invention, nevertherless do not lead to gelled products.

The polymerization is so carried out that a solution of the polymer with a solid content of 40 to 65 percent by weight results. The solid content is a function of the fraction of monopolymerized, multiply ethylenic unsaturated monomers. If this fraction is low, then polymerization can take place at greater solid contents. It is furthermore necessary to use suitable initiators and, depending on the fraction of difunctional monomers, at least 0.5 percent by weight, preferably however, at least 2.5 percent by weight, of a polymerization regulator. The choice of initiator depends on the fraction of difunctional monomers used. With low fraction the initiators customary for such temperatures, such as peroxy esters, can be used. With greater fraction of difunctional monomer initiators such as for example azo compounds, are preferably used. After the polymerization the polymer solution is concentrated to the desired colid content by separation by distillation of the solvent, preferable to solid contents of 60 percent by weight. The so obtained clear copolymer solutions have, adjusted to a solid content of 50 percent by weight, a viscosity of 0.4 to 10 dPas.

The polymerization is carried out in the presence of an organic solvent. Examples are ethanol, isopropanol, n-propanol, n-butanol, isobutanol, t-butanol, methyl, ethyl, propyl, and butyl esters of acetic acid, acetone, methylethyl ketone, xylene, toluene.

Suitable as polymerization regulators are preferably mercapto groups-containing compounds, wherein particularly preferred mercaptoethanol is used. Other possible regulators are, for example, t-dodecylmercaptan, phenylmercaptan, octyldecylmercaptan, butylmarcaptan, and thiocarboxylic acids such as perhaps thiolactic acid.

In the production of the acrylate copolymer according to certain aspects of the invention no hydroxy mercaptans or mercaptans having primary —SH groups are to be used as polymerization regulators. In the choice of the polymerization regulator in the production of the acrylates according to other aspects of the invention, care should be taken that no thiocarboxylic acids are used.

As component C) (aminoplastic resin) melamine formaldehyde resins, urea formaldehyde resins, and benzoguanamine resins are possible. These can be fully to partially methylolated, but can also still contain free —NH groups. As component C) partially and fully etherified resins can be used. Use of mixed etherified products is often of advantage. As etherification alcohol methanol, ethanol, propanol, iso-butanol, n-butanol, and ethylhexanol are possible.

The present invention also relates to a method for the production of the curable previously described compounds, characterized in that the polymer is mixed with at least two epoxide groups B) and the aminoplastic resin C) in an organic solvent and that this mixture is mixed with the COOH polymer A) before being processed.

The invention also relates to coating materials which are characterized in that they contain the previously described curable compounds, if necessary catalysts, organic solvents, if necessary, pigments and customary auxiliary agent and additives.

If the catalyst for the epoxy-carboxy cross-linkage is incorporated into the polymer, then the quantity depends on the desired baking temperature. At increased temperatures less tertiary amine is incorporated, at low baking temperature more. of the tertiary amine is incorporated.

When using the coatings for transparent lacquer aliphatic amines should primarily be incorporated, since aromatic amines often lead to discolorations. It is understood, that additionally external catalysts can also be used. Suitable catalysts are metal salts, for example chromium compounds, aluminum- and titanium compounds.

The baking temperatures of the described curable compounds are in general 80° to 180° C. Through the fraction of incorporated catalysts the coating materials can advantageously be adjusted to the desired baking temperature.

The described curable compositions yield coatings with excellent properties with respect to resistance to long-term stress by solvents, chemicals, water or water vapor, and with respect to hardness and elasticity.

In addition, a relatively high solid content of the curable coating materials is achieved at relatively low viscosity.

The coating materials based on the described curable composition can be applied as filler, covering lacquer and as base and/or transparent lacquer of a metallic multilayer lacquer.

The invention is explained below in greater detail in conjunction with embodiment examples:

The viscosity values were determined on a Plate-Cone viscosimeter at 23° C., the solid values were determined in a forced-air oven, if not stated otherwise, at 1 hour at 130° C. The acid numbers are given in mg KOH/g resin and refer to the solid resin. The epoxide equivalent weights refer likewise to solid resin.

PRODUCTION OF COPOLYMER SOLUTIONS ACCORDING TO THE INVENTION

Production of a Branched COOH Acrylate, A1

Into a 4 liter high-grade steel boiler are placed
376.8 parts xylene
376.8 parts butanol
188.4 parts methylisobutyl ketone
Weighed and mixed in the monomer tank are
100 parts methyl methacrylate
100 parts n-butyl acrylate
170 parts tert-butyl acrylate
100 parts ethylhexyl acrylate
100 parts styrene
200 parts hexanediol dimethacrylate
200 parts acrylic acid
30 parts dimethylaminoethyl methacrylate
50 parts mercaptoethanol Weighed and mixed in the initiator tank are:
36.0 parts 2,2'-azobis(2-methylbutanonitrile)
57.6 parts xylene
57.6 parts butanol
28.8 parts methylisobutyl ketone The receiving vessel is heated to 110° C. and the monomer tank is apportioned uniformly over a period of 3 hours, the initiator tank is apportioned uniformly over 3.5 hours. Both feeds are started simultaneously. During the polymerization the temperature is maintained at 110° C., following the end of the feed, after-polymerization takes place for another 2.5 hours. The thus obtained clear solution of the branched acrylate has a viscosity of 2.2 dPas (230° C.), a solid content of 49.6%, and an acid number of 132.6.

Production of a Glycidyl Groups-containing Acrylate B1

Into a 4 liter high-grade steel boiler are placled and heated to 110° C.:
282.9 parts xylene
565.8 parts 1-methoxypropyl-2-acetate
Feed 1:
270 parts glycidyl methacrylate
Feed 2:
135 parts methyl methacrylate
90 parts styrene
180 parts n-butyl acrylate
135 parts hexanediol diacrylate
45 parts ethylhexyl acrylate
45 parts hyrodypropyl methacrylate
40.5 parts mercaptoethanol
Feed 3:
40.8 parts xylene
81.6 parts 1-methoxypropyl-2-acetate
30.6 parts 2,2'-azobis(2-methylbutanonitrile)

Feeds 1, 2, and 3 are started simultaneously; feed 1 is apportioned uniformly in portions over 2.5 hours, feed 2 over three hours, feed 3 over 3.5 hours. During the polymerization the temperature is kept at 110° C., subsequently after polymerization takes place for an additional 3 hours at 110° C. Subsequently 330 parts of the solvent mixture are distilled off. The so obtained clear solution of the glycidyl groups-containing acrylate resin has a solid content of 58.8, a viscosity of 8.0 dPas, and an epoxide equivalent weight of 561.

Production of the Glycidyl Groups-containing Acrylate B2

Into a 4 liter high-grade steel boiler are placed and heated to 110° C:
282.9 parts xylene
565.8 parts 1-methoxypropyl-2-acetate
Weighed and mixed in the individual feed tanks are:
Feed 1: 270 parts glycidyl methacrylate
Feed 2: 45 parts hydroxypropyl methacrylate
Feed 3:
135 parts methyl methacrylate
90 parts styrene
180 parts n-butyl acrylate
135 parts hexanediol diacrylate
45 parts ethylhexyl acrylate
40.5 parts mercaptoethanol
Feed 4:
40.8 parts xylene
81.6 parts 1-methoxypropyl-2-acetate
30.6 parts 2,2'-azobis(2-methylbutanonitrile)

Feeds 1, 3, and 4 are started simultaneously. Feed 1 is apportioned over 2.5 hours, feed 3 over 3 hours, feed 4 over 3.5 hours. Feed 2 is started after the end of feed 1 and added over 0.5 hours. During the polymerization the temperature is maintained at 110° C., after-polymerization takes place subsequently for another 3 hours. 326 parts of the solvent mixture are distilled off. The thus obtained clear acrylate resin solution has a solid content of 59.2%, a viscosity of 9.5 dPas, and an epoxide equivalent weight of 553.

Transparent lacquer 1: 91.7 parts of the resin solution B2 according to the invention are mixed with 13.8 parts of a methanol/butanol mixed etherified melamine resin (Cymel 1130) and subsequently added to 85.14 parts of the acrylate resin solution A1.

Transparent lacquer 2: 94.12 parts of the resin solution B1 are mixed with 14 parts cf a butanol part-etherified melamine resin (Cymel 1158), subsequently 85.14 parts of the COOH acrylate solution A1 are added.

The lacquers are diluted with a small amount of pentanol and squeegeed onto sheets of glass at a wet film thickness of 100 μm. The films are baked for 30 minutes at 1200° C.

Transparent lacquer 1: 2 hours after oven: pendulum hardness 120.4 seconds, 5 minutes high-grade gasoline Transparent lacquer 2: 2 hours after oven: Pendulum hardness 187.6 seconds, 5 minutes high-grade gasoline f.i.O.

I claim:

1. A curable composition comprising:
    A) a polymer having at least tow —COOH groups,
    B) a polymer having at least two epoxide groups, and
    C) an aminoplastic resin, characterized in that as component A) a soluble branched acrylate copolymer is obtained by copolymerization of:
    a1) 5 to 30 percent by weight of a monomer with at least two polymerizable olefinic unsaturated double bonds wherein di- and polyesters of di- and polyols with acrylic acid are excluded,
    a2) 3 to 50 percent by weight of a carboxylic groups-containing monomer,
    a4) 0.1 to 20 percent by weight of a tertiary amine with a polymerizable olefinic unsaturated double bond,
    a5) 0 to 40 percent by weight of a hydroxyl groups-containing monomer, and
    a3) 0 to 80 percent by weight of a further monomer with a polymerizable olefinic unsaturated double bond, wherein the sum of components a1), a2), a3), a4) and a5) is 100 percent by weight and at least one of the components a1), a2), a3), a4) and a5) is an acrylate monomer, in an organic solvent at 70° to 130° C., using at least 0.5 percent by weight relative to the total weight of the monomers, of a polymerization regulator and using a polymerization initiator, wherein the polymerization of the acrylate copolymer is carried out so that a solution of the polymer with a solid content of 40 to 65 percent by weight results, wherein the proportions of the individual components to each other are so selected that between the carboxyl groups of component A) and the epoxide groups of component B) a molar ratio of 3:1 to 1:3 is obtained and that between the epoxide resin component and the aminoplastic resin component a wight ratio of 65:35 percent by weight to 98:2 percent by weight is obtained.

2. A curable composition comprising:
A) a polymer having at least two —COOH groups,
B) a polymer having at least two epoxide groups, and
C) an aminoplastic resin, characterized in that component B) is a soluble branched acrylate copolymer obtained by copolymerization of:
- b1) 5 to 30 percent by weight of a monomer having at least two polymerizable olefinic unsaturated double bonds,
- b2) 5 to 50 percent by weight of a monomer having an epoxide group, and
- b3) at least 10 percent by weight of an additional monomer having a polymerizable, olefinic unsaturated double bond, wherein at least one of the components b1), b2) and b3) is an acrylate monomer and the sum of components b1), b2) and b3) is 100 percent by weight, in an organic solvent at 70° to 130° C., using at least 0.5 percent by weight, relative to the total weight of the monomers, of a polymerization regulator and using a polymerization initiator, wherein the polymerization is carried out so that a solution of the polymer results having a solid content of 40 to 65 percent by weight, wherein the proportions of the individual components are selected so that between the carboxylic groups of component A) and the epoxide groups of component B) a molar ratio of 3:1 to 1:3 is obtained and that between the epoxide resin component and the aminoplastic resin component a weight ratio of 65:35 percent by weight to 98:2 percent by weight is obtained.

3. A curable composition comprising:
A) a polymer having at least two —COOH groups,
B) a polymer having at least two epoxide groups, and
C) an aminoplastic resin, characterized in that component B) is a soluble branched acrylate copolymer obtained by copolymerization of:
- b1) 5 to 30 percent by weight of a monomer having at least two polymerizable olefinic unsaturated double bonds,
- 4) 5 to 50 percent by weight of a monomer having at least one polymerizable double bond and one functional group F, wherein F is a carboxylic acid or an isocyanate group, and
- b3) a further polymerizable monomer, wherein the sum of components b1), b4) and b3) is 100 percent by weight, in an organic solvent at 70° to 130° C., using at least 0.5 percent by weight, relative to the total weight of the monomers, of a polymerization regulator and using a polymerization initiator, wherein the polymerization of the acrylate copolymer is carried out so that a solution of the polymer results having a solid content of 40 to 65 percent by weight which is then reacted with b5) an organic compound having at least one epoxide group and one hydroxyl or epoxy group reactive with the functional group F of the monomers from b4), and wherein the proportions of the individual components are selected so that between the carboxylic groups of component A) and the epoxide groups of component B) a molar ratio of 3:1 to 1:3 is obtained and that between the epoxide resin component and the aminoplastic resin component a weight ratio of 65:35 percent by weight of 98:2 percent by weight is obtained.

4. A curable composition as stated in claim 1, characterized in that the component a1) corresponds to the formula

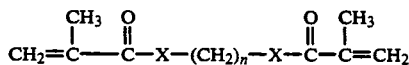

in which
X=O, NR' or S with R'=H, alkyl, aryl, and
n=2 to 8 or
a divinyl compound.

5. A curable composition as stated in claim 1, characterized in that the carboxyl groups-containing monomer (a2) comprises B-carboxyethyl acrylate.

6. A curable composition as stated in claim 1, characterized in that the carboxyl groups-containing monomer (a2) comprises a monomer with phosphoric acid groups.

7. A curable composition as described in one of claim 1, 2 and 3 characterized in that the monomer (a3) or (b3) is selected from the group consisting of styrene, vinyl toluene, alkyl esters of acrylic acid and methacrylic acid, alkoxyalkyl acrylate and aryloxyalkyl acrylate and the corresponding methacrylates, esters of maleic, fumaric, crotonic, and dimethyl acrylic acid.

8. A coating composition as described in any one of claims 1, 2 and 3 wherein polymerization of the soluble branched acrylate copolymer (A) or (B) is conducted at a temperature in the range of 80° C. to 120° C.

9. A coating composition in accordance with any one of claim 1, 2 and 3 wherein the branched acrylate copolymer is in the form of a pre-crosslinked polymer solution.

10. A process for the preparation of a curable composition as claimed in any one of claims 1, 2, or 3, comprising the steps of:
(1) mixing component B) and component C) in the organic solvent, then
(2) adding component A) into the organic solvent wherein the polymerization of component A) is carried out.

* * * * *

UNITED STATES PATENT AND TRADEMARK OFFICE
CERTIFICATE OF CORRECTION

PATENT NO. : 5,331,052
DATED : JULY 19, 1994
INVENTOR(S) : Jung

It is certified that error appears in the above-indentified patent and that said Letters Patent is hereby corrected as shown below:

Column 2, line 60,
Column 4, line 21,
Column 5, line 29,
Column 6, line 33 and
Column 10, line 16 change "1300°" to -- 130° --;

Column 5, line 30 and column 14, line 23 change "1200°" to -- 120° --;

Column 10, line 55 and column 11, line 11 change "galled" to -- gelled --;

Column 12, line 17 change "more." to -- more --;

Column 13, line 14 change "230°" to -- 23° --;

Column 13, line 42 change "after polymerization" to -- after-polymerization --;

Column 13, line 59 do not bold "135";

Column 14, line 17 change "cf" to -- of --;

Column 14, line 25 change "gasoline" to -- gasoline i o. --;

line 31, change "tow" to -- two --;

UNITED STATES PATENT AND TRADEMARK OFFICE
CERTIFICATE OF CORRECTION

PATENT NO. : 5,331,052
DATED : July 19, 1994
INVENTOR(S) : Jung

It is certified that error appears in the above-indentified patent and that said Letters Patent is hereby corrected as shown below:

Column 15, line 1 change "wight" to -- weight --;

Column 16, lines 35 & 47 change "claim" to -- claims --.

Signed and Sealed this

Fourteenth Day of March, 1995

BRUCE LEHMAN

*Attest:*

*Attesting Officer*     *Commissioner of Patents and Trademarks*